US007753231B2

(12) United States Patent
Giles et al.

(10) Patent No.: US 7,753,231 B2
(45) Date of Patent: Jul. 13, 2010

(54) AUTOMATIC CONTROLLER FOR A BEVERAGE DISPENSING FAUCET

(75) Inventors: Thomas E. Giles, Orfordville, WI (US); William L. Pursell, Madison, WI (US); Neil D. Roiland, Deerfield, WI (US); David Timpel, Deerfield, WI (US)

(73) Assignee: Berg Company, LLC, Monona, WI (US)

( * ) Notice: Subject to any disclaimer, the term of this patent is extended or adjusted under 35 U.S.C. 154(b) by 640 days.

(21) Appl. No.: 11/734,051

(22) Filed: Apr. 11, 2007

(65) Prior Publication Data

US 2008/0251533 A1    Oct. 16, 2008

(51) Int. Cl.
    *B67D 7/30* (2010.01)
(52) U.S. Cl. .......................... 222/14; 222/20; 141/209
(58) Field of Classification Search .............. 222/14, 222/20, 17, 52, 59, 504, 505; 141/192, 52, 141/291, 11, 206–209, 198
    See application file for complete search history.

(56) References Cited

U.S. PATENT DOCUMENTS

| 3,900,136 | A |   | 8/1975 | Patanto |   |
|---|---|---|---|---|---|
| 4,111,243 | A | * | 9/1978 | Fetterman | 141/102 |
| 5,022,557 | A | * | 6/1991 | Turner | 222/54 |
| 5,381,926 | A | * | 1/1995 | Credle et al. | 222/1 |
| 5,431,302 | A | * | 7/1995 | Tulley et al. | 222/14 |
| 5,454,406 | A | * | 10/1995 | Rejret et al. | 141/1 |
| 6,398,084 | B2 | * | 6/2002 | Maruyama et al. | 222/504 |

FOREIGN PATENT DOCUMENTS

| JP | 9-48498 | * | 2/1997 | 222/14 |
| JP | 9-132296 | * | 5/1997 | 222/14 |

OTHER PUBLICATIONS

"Stainless Steel Beer Faucets" product brochure Perlick Corporation models 425s and 425SS.
"TAP1 Installation/Service and User Manual", Berg Company, LLC, Sep. 1999, selected pages.

* cited by examiner

*Primary Examiner*—Lien T Ngo
(74) *Attorney, Agent, or Firm*—George E Haas; Quarles & Brady LLP

(57) ABSTRACT

A beverage dispenser has a faucet with a spout, a fitting for connection to a beverage supply, and a lever operated valve. A servo motor, coupled to the lever, operates the faucet and proportionally controls the flow of the beverage. That proportional flow control manages the amount of beverage foaming. A flow sensor has a magnetic turbine within the faucet and a Hall effect element that magnetically senses turbine motion and produces a signal indicating an amount of beverage flow. A keypad enables service personnel to designate various portions of the beverage to automatically fill serving containers of different sizes. A control circuit responds to activation of the keypad and to the flow sensor by operating the servo motor to dispense the related quantity of the beverage.

17 Claims, 2 Drawing Sheets

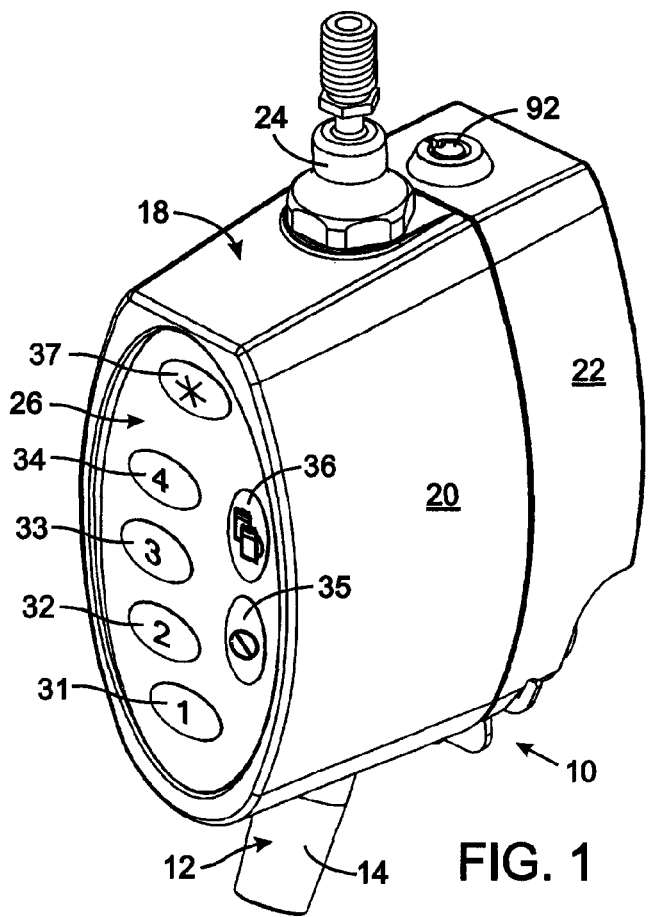
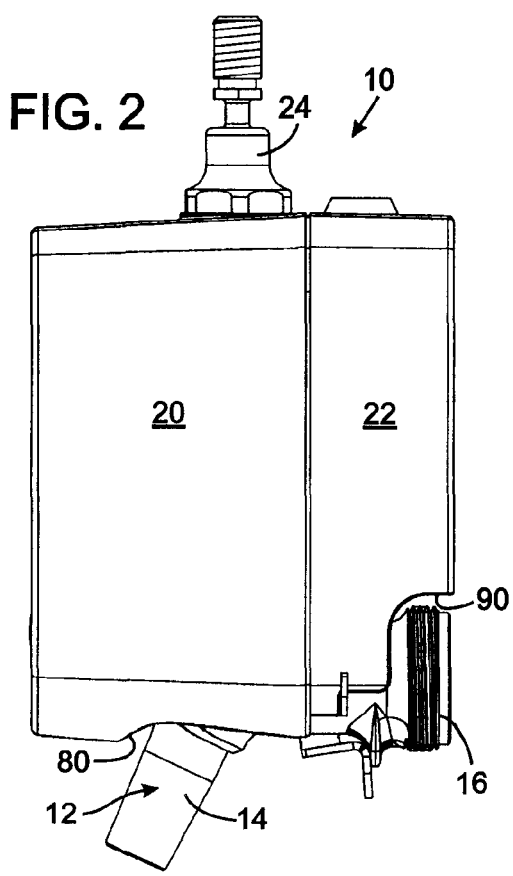
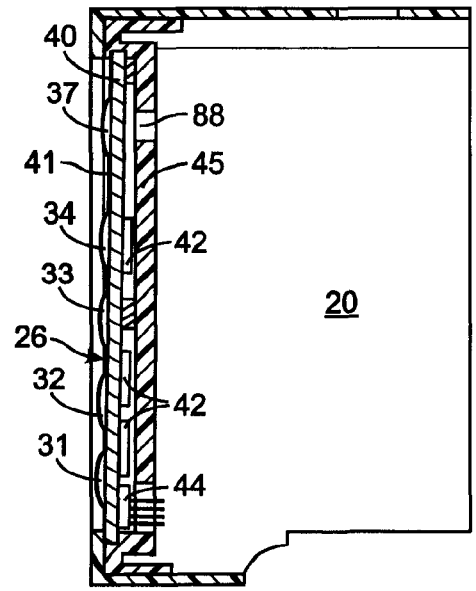

US 7,753,231 B2

AUTOMATIC CONTROLLER FOR A BEVERAGE DISPENSING FAUCET

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to automatic beverage dispensing systems, and particularly to such systems for controlling the operation of a conventional dispensing faucet, commonly referred to as a "tap".

2. Description of the Related Art

Beverages, such as beer and soft drinks, are frequently dispensed in taverns and restaurants from systems that have a faucet. A basic beverage dispensing system has manually activated faucets in which a person operates a valve lever either by hand or by a serving container inserted under the faucet. For a standard manual beer faucet, a lever is moved in one direction to open a valve, thereby sending beer through a spout into a container placed under the faucet. Movement of the lever in the opposite direction closes the valve and terminates the flow of beer. Regardless of the type of manual faucet, the user is required to constantly monitor filling of the serving container and close the faucet upon dispensing the desired portion of the beverage.

Automatic beverage dispensing systems are now being provided in taverns and restaurants for filling serving containers of different sizes without requiring continuous monitoring by the server. Such systems have a number of pushbuttons by which the server designates the size of the container to be filled. In response to the activation of one of the pushbuttons, a corresponding quantity of beverage flows through a spout into the container. Such automatic systems employ solenoid valves or a solenoid device that pinches a flexible tube to control the flow of the beverage. These prior electrically operated flow control mechanisms have only two states, opened and closed, and do not proportionally control the flow of the beverage. It is a concern that an electrically operated valve could become stuck in the open state in the event of a power loss or equipment failure.

The beverage dispensing systems, including the faucets and lines feeding the faucets are required to be cleaned on a regular basis, as often as once a week, to avoid the beverage, particularly beer, having a degraded-taste or containing particles. Such cleaning traditionally requires the disassembly of the beverage faucet which is a laborious process. Therefore components of an automated dispensing system must permit easy cleaning of the faucet so that serving personnel are not discouraged from performing the cleaning.

As a consequence, it is desirable to provide an improved automated control system for dispensing beverages.

SUMMARY OF THE INVENTION

A dispenser for a beverage, such as beer, has a housing that encloses a faucet, a servo motor, and a control circuit. A keypad is attached to the housing and has a plurality of switches by which serving people operate the beverage dispenser. The faucet is mounted on a bracket within the housing and has a spout, a fitting for connection to a beverage supply line, and a valve which is operated by a lever to control flow of the beverage from the fitting to the spout. The servo motor also is mounted on the bracket and is coupled to operate the lever to open and close the faucet. The servo motor is able to open the faucet by varying amounts to control proportionally the flow of the beverage. Such proportional flow control enables the dispensing to be adjusted to manage the amount of beverage foaming.

The control circuit responds to activation of the plurality of switches by driving the servo motor to open the faucet and dispense the beverage. Depending upon the particular switch that is activated the faucet is opened to dispense different quantities of the beverage and thereby automatically fill serving containers of different sizes. Preferably, a flow sensor is employed to measure the amount of beverage flowing though the faucet which enables the control circuit to command the motor to close the faucet when the appropriate portion of beverage has been dispensed.

An aspect of the present beverage dispenser provides a manual shut-off mechanism in the event of a power failure. The shut-off mechanism is designed so that it cannot be used to open the valve and circumvent the control circuit monitoring the dispensing operations. Another aspect is the ability to operate the faucet in a clean-in-place mode by entering a code into the keypad.

BRIEF DESCRIPTION OF THE DRAWINGS

FIG. 1 is a perspective view of an automatic beverage faucet according to the present invention;

FIG. 2 is a side view of the automatic beverage faucet;

FIG. 3 is a vertical cross sectional view through a front cover of the automatic beverage faucet;

DETAILED DESCRIPTION OF THE INVENTION

Figure 4:
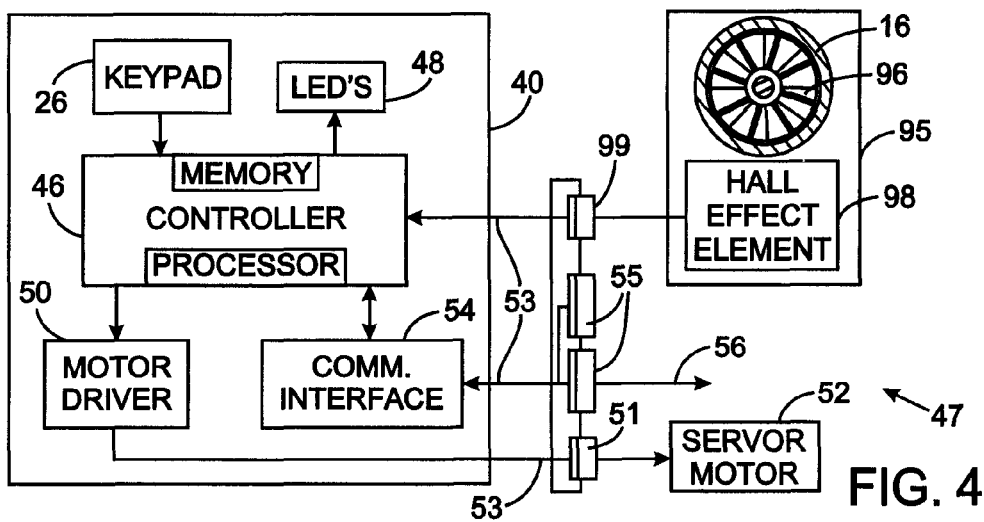
FIG. 4 is a schematic block diagram of the electrical circuit for the automatic beverage faucet.

With initial reference to FIG. 1, a beverage dispenser 10 automatically dispenses different quantities of a beverage, such as beer, to fill a glass, a mug or a pitcher as selected by the user. The beverage dispenser 10 operates a faucet 12, such as a model 425SSB available from Perlick Corporation of Milwaukee, Wis. USA, that has a spout 14 and a fitting 16 for connection to a conduit through which beer is supplied under pressure from a keg (not shown). By using a commercially available faucet, the beverage dispenser does not have to be separately certified by NSF International as satisfying certain health and safety standards. The faucet 12, also referred to as a "tap", is enclosed in a housing 18 that has a front cover 20 and a removable rear cover 22 that fit together. The front cover 20 includes a mount 24 for receiving a conventional faucet handle (not shown) which identifies the brand of beer being dispensed from the beverage dispenser 10. A bar typically has several of these beverage dispensers in a row with each beer being identified by a different non-operable handle.

The front cover 20 includes a keypad 26 with seven pushbutton switches 31-37 by which the bartender selects a desired dispensing function. Four selector switches 31-34 on the keypad 26 are used to designate different serving portion sizes depending upon whether a small glass, a large glass, a mug, or a pitcher is to be filled. Activation of a cancel switch 35 terminates a pour that is in progress, while a repeat switch 36 enables dispensing the selected portion into multiple containers of the same size. A shift switch 37, when activated immediately prior to pressing one of the selector switches 31-34, selects a different set of four sizes of serving portions for those switches, thereby enabling automated dispensing into eight different sized containers.

With reference to FIG. 3, the seven switches 31-37 of the keypad 26 are mounted on a front face of a printed circuit board 40 over which a printed cover sheet 41 is applied to identify the switches. The keypad is also constructed with its outer edges wrapping around the edges of the printed circuit board 40 so that when fastened to the front cover 20, a water tight barrier is formed the protects the printed circuit board from damage due to liquids splashing on the front of the dispenser. Various electrical circuit components 42 are mounted on the rear surface of the printed circuit board 40 which also is electrically connected to other component in the beverage dispenser 10, as will be described. An electrical connector 44 projects inward from the rear surface to facilitate direct programming or reprogramming of the controller during production or servicing the dispenser. The printed circuit board 40 is held against the front cover 20 by mounting studs protruding through a retainer 45 and secured by nuts.

FIG. 4 depicts the control circuit 47 comprising the printed circuit board 40 and other components of the beverage dispenser 10. Specifically the keypad 26 and its individual switches 31-37 are connected to inputs of a controller 46, such as any one of several commercially available microcomputers that include a processor, a memory for a software program and data, and input/output circuits. A plurality of light emitting diodes (LED's) are operated by the controller to backlight the keypad 26 and also to indicate which function associated with the switches 31-37 is active. For example, the LED associated with the shift switch 37 for the shift function blinks to indicate that the alternative beverage portions are now enabled for the selector switches 31-34.

Figure 5:
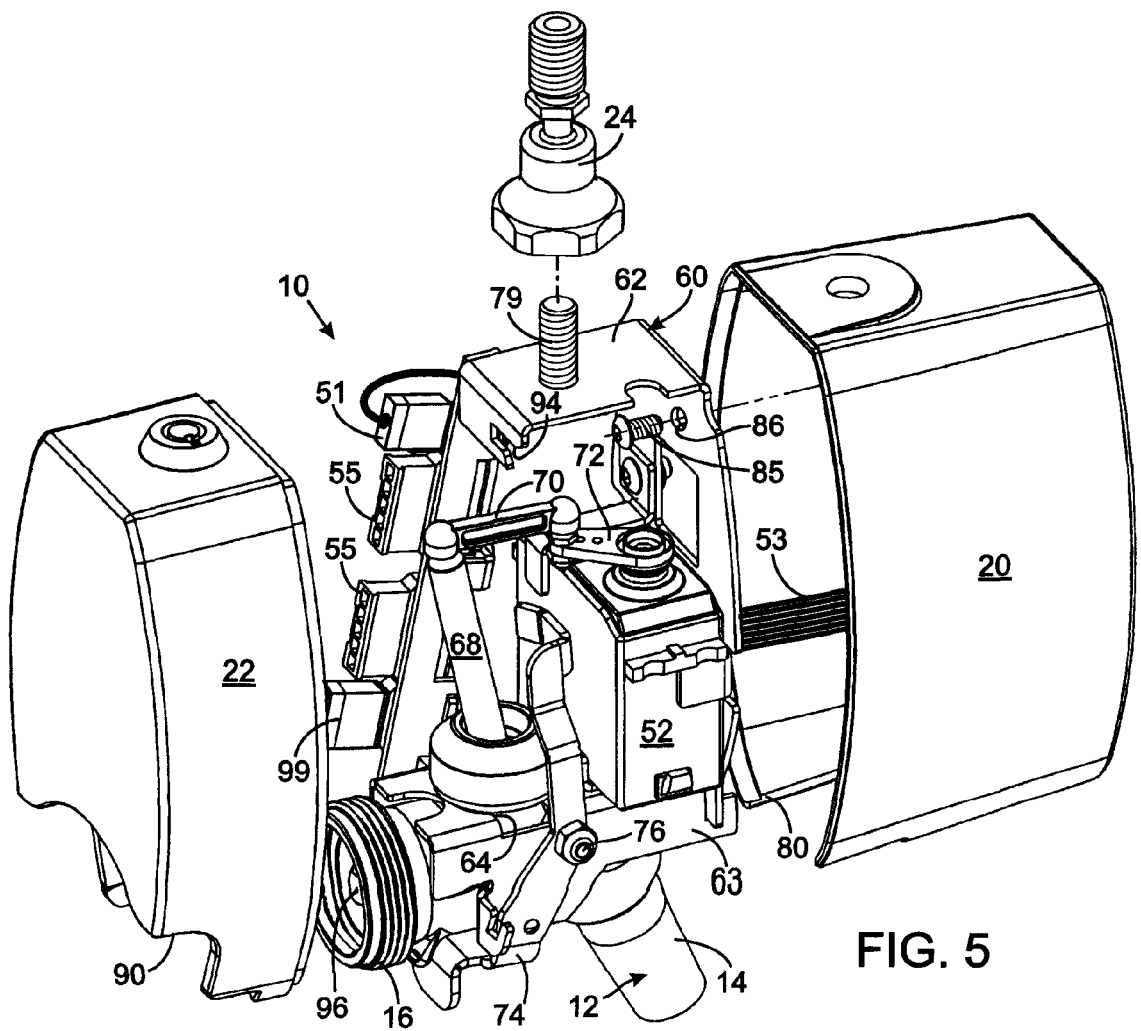
FIG. 5 is an exploded view of the automatic beverage faucet.

The controller 46 also controls a motor driver 50 that operates a motor 52 which physically opens and closes the beverage faucet 12, as will be described and is connected to printed circuit board 40 through wires 53 that lead to connector 51. A communication interface 54 is provided by which the controller 46 communicates over a network 56 with point of sale equipment (POS) or other computer system for tabulating beverage dispensing operations and the quantity of the beverage that is dispensed. Such external equipment and the protocols to communicate therewith are well known within the food service industry. The communications interface is also used for dispenser setup including assigning addresses to each dispenser, reprogramming the controller firmware, and setting up drink sizes for communicating to the POS equipment. As shown in FIG. 5, a pair of connectors 55 enable several beverage dispensers to be connected in a daisy chain manner to the network 56. The connection to the network 56 also provides electrical power to the beverage dispenser 10.

A motor 52 is connected by wires to the motor driver 50 on the printed circuit board 40. With reference to FIG. 5, the motor 52 is fastened to a bracket 60 that has upper and lower sections 62 and 63, respectively. The faucet 12 has a tubular collar that extends upward through an aperture 64 in the bracket's lower section 63 positioning the bracket so it can be welded to the faucet thereby securing those components together. A valve lever 68 extends upward through the faucet collar and pivots left and right in the drawing, i.e. front to back in the typical orientation of the dispenser 10 to a user. The upper end of the valve lever 68 is pivotally coupled by a link arm 70 to a crank 72 that is mounted on the shaft of the motor 52. As the motor 52 rotates through approximately 70 degrees, the crank 72 moves the valve lever 68 between open and closed positions. Preferably the motor 52 is a servo motor that is controllable to selectively move the crank 72 different amounts, thereby opening the faucet 12 to proportionally different extents to vary the flow rate of the beverage being dispensed from the spout 14. The controller 46 can command different drive signals to govern the amount of servo motor motion.

A manual shut-off lever 74 is connected at a pivot 76 on the lower section 63 of the bracket 60 and a lower end of that lever projects downward beneath the faucet 12. Moving the lower end of the shut-off lever 74 downward when the faucet is open, i.e. the valve lever 68 is pivoted rightward from the illustrated position, results in the upper end of the shut-off lever pushing the valve lever to the left, closing the faucet 12. This shut-off lever 74 is used in the event that power is lost to the beverage dispenser 10 or a malfunction occurs which prevents operation of the servo motor 52 to close the valve. However, it should be noted that the manual shut-off lever 74 does not engage the valve lever 68 in a manner that allows manual opening of the beverage faucet 12. Thus a bartender is unable to manually operate the faucet to dispense the beverage without that operation being tallied by the point of sale equipment system or the computer to which the beverage dispenser is electrically connected.

Referring to FIGS. 2 and 5, the internal bracket 60 also holds the front and rear covers 20 and 22 together in a manner that prevents tampering with the beverage dispenser 10. Specifically the front cover 20 has a generally U-shaped opening 80 in its bottom through which the spout 14 of the faucet 12 projects from the assembled device. The top of the front cover 20 has a circular aperture 78 through which a threaded stud 79 on the bracket 60 extends in the assembled device. That is during assembly, the cover is slid horizontally over the bracket 60 and then dropped downward so that stud 79 passes through aperture 78 until the inner surface of the front cover 20 rests against the upper section 62. At the same time a cover bracket (not shown), that is secured to the lower inside of the front cover 20, hooks into the front of bracket 63 locking the top and bottom of the front cover to bracket 60. Once the front cover 20 has been so positioned, a machine screw 85 is inserted through an aperture 86 in the bracket 60 and threaded into a receiving hole 88 in the retainer 45 inside the front cover 20, see FIG. 3. This secures the front cover 20 from being removed from the bracket without first removing the rear cover 22. The rear cover 22 has a cut away region 90 at its bottom and lower rear surfaces through which access is provided to the fitting 16 for the beverage supply line. This allows the rear cover 22 to slide horizontally onto the back of the faucet 12. A lock 92, located on the top surface of the rear cover 22, has a hook-like latch (not visible, that rotates within the rear cover 22 to engage and disengage a groove 94 in the rear of the upper section 62 of the bracket 60. That engagement secures the rear cover 22 to the bracket 60 and prevents removal without utilization of the key for the lock 92. Securing the front and rear covers 22 of the dispenser housing 18 in this manner prevents an unauthorized bartender from opening the beverage dispenser 10 and manually operating the faucet 12 to dispense the beverage without being tallied by the point of sale equipment or the computer to which the dispenser communicates.

With reference to FIGS. 4 and 5, the beverage dispenser 10 preferably includes an optional flow sensor 95 to measure the amount of beverage being dispensed. The flow sensor 95 comprises a turbine 96 that is rotatably mounted within the fitting 16 for the beverage supply line. The turbine 96 is magnetized thereby producing a magnetic field that varies as the turbine rotates in response to the flow of beverage. That varying magnetic field is detected by a Hall effect element 98 located outside the faucet, adjacent the turbine 96 and connected to the controller 46 through connector 99. The turbine 96 makes a full rotation in response to a known amount of fluid flowing through the faucet 12. That rotation and the resultant variation of the magnetic field produced by the turbine causes the Hall effect element 98 to generate a pulsed electrical signal that indicates the number of revolutions of the turbine. That pulse signal is applied to the controller 46 which counts those pulses to determine the quantity of beverage being dispensed during each pouring operation. This enables the controller to determine when the proper quantity of beverage has been dispensed from the spout 14 for the given size serving container designated by the particular selector switch 31-34 that was pressed by the user. This flow sensing mechanism is more accurate than previous automated dispensing systems which assumed that a known beverage flow rate remained constant and opened a valve for a predetermined amount of time related to the selected serving container size. A time based system does not account for variations in the flow rate due to supply pressure fluctuations. Thus regardless of fluctuations in the pressure of the beverage in the supply line, the present system dispenses the proper quantity of beverage for the selected size serving container.

Beverage Dispenser Operation.

With reference to FIG. 1, normally all the light emitting diodes 48, associated with the seven switches 31-37, are illuminated thereby indicating that the beverage dispenser 10 is powered and ready to dispense. A server, by pressing one of the four selector switches 31-34, activates a pouring cycle for one of four different sized serving containers that has been placed beneath the faucet spout 14. The software executed by the controller 46 in FIG. 5 responds to the activation of a particular selector switch 31-34 by sending a command to the motor driver 50 which in turn activates the servo motor 52 to open the valve of the faucet 12. With reference to FIG. 5, the servo motor then turns the crank 72 moving the valve lever 68 from the illustrated closed position to the right and opening the faucet valve. Specifically the controller commands the servo motor 52 to open the faucet 12 a predefined amount to produce a desired rate of beverage flow through the valve. The flow rate can be set for the particular brand of beer to control the amount of foaming in the serving container and thus create a desired head on the beer.

Upon opening the faucet 12, the controller 46 either begins detecting the signal from the optional flow sensor 95 to measure the quantity of beverage flowing through the faucet or, if flow sensing is not implemented, the controller 46 activates a timer to measure a predefined dispensing interval associated with the particular size serving container that has been selected.

Typically the faucet 12 remains open until the predefined amount of beverage has been dispensed or the predefined dispensing interval has elapsed. However, the dispensing cycle can be paused by the operator again pressing the same selector switch 31-34 that was used to initiate the dispensing. Pressing that selector button yet another time resumes the dispensing cycle and the flow measurement or timer. Alternatively, dispensing operation can be terminated manually by the server pressing the cancel switch 35. Either pausing, canceling or the completing the dispensing cycle causes the controller 46 to command the motor driver 50 to operate the servo motor 52 in the reverse direction and rotate the crank 72 into the position illustrated in FIG. 5 at which the valve lever 68 is in the closed position.

Pressing the repeat switch 36 prior to pressing one of the selector switches 31-34 causes the identical amounted of the beverage to be dispensed repeatedly to fill a plurality of serving containers of the same size. After each pouring cycle the beverage flow is interrupted automatically for a few seconds to allow the server to switch containers. Pressing the repeat switch 36 again terminates the dispensing operation after filling the current container.

The entire beverage dispensing system, including the faucet and supply line feeding the faucet is required to be cleaned periodically. Previously this required disassembly of the faucet, however the preferred faucet 12 used in the beverage dispenser 10 is a clean-in-place type, which does not require disassembly. To clean the present beverage dispensing system, a pressurized source of a cleaning solution is connected to the supply line in place of the beer keg. Then the faucet must be opened for a prolonged time to allow the cleaning solution to flow through the supply line and the faucet. This is accomplished by a person entering a designated code by pressing a sequence of several of the seven switches 31-37, to which the controller 46 responds by commanding the servo motor 52 to open the faucet 12. The faucet remains in this open state indefinitely, until any one of the switches 31-37 is activated again. This enables the cleaning solution, subsequent rinse water, and a reconnected supply of beer to flow through the system. Typically only a manager of the tavern knows the code for the cleaning mode, so that regular bartenders cannot use that code as a way to serve beer without the transaction being tallied by the point of sale system to which the beverage dispenser 10 communicates via network 56.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A dispenser for a beverage comprising:
a housing;
a faucet received within the housing and having a spout, a fitting for connection to a beverage supply, and a valve operated by a lever to control flow of the beverage from the fitting to the spout;
a servo motor received within the housing and coupled to the lever to control proportionally the flow of the beverage;
a manual shut-off lever which engages the lever of the faucet to apply a force that closes the valve, wherein the manual shut-off lever is incapable of being operated to open the valve;
a keypad mounted on the housing and manually operable by a user of the dispenser; and
a control circuit connected to the keypad and the servo motor and responding to signals received from the keypad by operating the servo motor to dispense a predefined quantity of beverage from the faucet.

2. The dispenser as recited in claim 1 further comprising a flow sensor having a turbine mounted within the faucet and rotatable by the flow of the beverage, and an element that produces an electrical signal in response to rotation of the turbine, wherein the electrical signal is applied to the control circuit.

3. The dispenser as recited in claim 1 further comprising a flow sensor having a turbine mounted within the faucet and producing magnetic field that varies in response to the flow of the beverage, and a Hall effect element that produces an electrical signal in response to the magnetic field, wherein the electrical signal is applied to the control circuit.

4. The dispenser as recited in claim 1 further comprising a crank that is rotatably connected to the servo motor, and a link arm connecting the crank to the lever of the faucet.

5. The dispenser as recited in claim 1 wherein the keypad comprises:
   a plurality of selector switches by which a user designates a first plurality of different sizes of serving portions of the beverage to dispense, wherein the control circuit responds to activation of each of the plurality of switches by operating the servo motor to dispense different quantities of the beverage;
   a pour cancellation switch for manual termination of beverage dispensing;
   a repeat pour switch for sequentially dispensing a plurality of serving portions of identical sizes as designated by activation of one of the plurality of switches.

6. The dispenser as recited in claim 5 wherein the keypad further comprises a shift switch, activation of which enables the plurality of switches to designate a second plurality of different sizes of serving portions of the beverage.

7. The dispenser as recited in claim 1 wherein the control circuit responds to activation of a predefined combination of switches on the keypad by entering a faucet cleaning mode in which the servo motor is operated to open the faucet until a switch on the keypad is activated again.

8. A dispenser for a beverage comprising:
   a housing having a bracket and a front cover extending around and secured to the bracket;
   a faucet fastened to the bracket and having a spout, a fitting for connection to a beverage supply, and a valve operated by a lever to control flow of the beverage from the fitting to the spout;
   a servo motor fastened to the front cover and coupled to the lever to operate proportionally the faucet and control the flow of the beverage;
   a manual shut-off lever which engages the lever of the faucet to close the valve, wherein the manual shut-off lever incapable of being operated to open the valve;
   a keypad attached to the front cover and having a plurality of switches that are manually operable;
   a control circuit within the housing and connected to the keypad and the servo motor, the control circuit including a controller that executes software that responds to signals received from the keypad by operating the servo motor to dispense predefined quantities of beverage.

9. The dispenser as recited in claim 8 further comprising a flow sensor mounted on the faucet and connected to the control circuit, the flow sensor producing an electrical signal indicating an amount of beverage flow through the faucet.

10. The dispenser as recited in claim 8 further comprising a flow sensor having a turbine mounted within the faucet and producing magnetic field that varies in response to the flow of the beverage, and a Hall effect element that produces an electrical signal in response to the magnetic field, wherein the electrical signal is applied to the control circuit.

11. The dispenser as recited in claim 8 further comprising a crank that is rotatably connected to the servo motor, and a link arm connecting the crank to the lever of the faucet.

12. The dispenser as recited in claim 8 wherein the plurality of switches comprises:
   a plurality of selector switches by which a user designates a first plurality of different sizes of serving portions of the beverage to dispense, wherein the control circuit responds to activation of each of the plurality of switches by operating the servo motor to dispense different quantities of the beverage;
   a pour cancellation switch for manual termination of beverage dispensing;
   a repeat pour switch for sequentially dispensing a plurality of serving portions of identical sizes as designated by activation of one of the plurality of switches.

13. The dispenser as recited in claim 12 wherein the keypad further comprises a shift switch, activation of which enables the plurality of switches to designate a second plurality of different sizes of serving portions of the beverage.

14. The dispenser as recited in claim 12 wherein the control circuit responds to activation of a predefined combination of the plurality of switches by entering a faucet cleaning mode in which the servo motor is operated to open the faucet until at least one of the plurality of switches is activated again.

15. A dispenser for a beverage comprising:
   a housing having a bracket and a front cover extending around and secured to the bracket;
   a faucet fastened to the bracket and having a spout, a fitting for connection to a beverage supply, and a valve operated by a lever to control flow of the beverage from the fitting to the spout;
   a servo motor fastened to the bracket and coupled to the lever to operate the faucet and proportionally control the flow of the beverage;
   a manual shut-off lever which engages the lever of the faucet to close the valve, wherein the manual shut-off lever incapable of being operated to open the valve;
   a keypad attached to the front cover and having a plurality of switches that are manually operable;
   flow sensor having a turbine mounted within the faucet and producing magnetic field that varies in response to the flow of the beverage, and a Hall effect element that produces an electrical signal in response to the magnetic field; and
   a control circuit within the housing and connected to the keypad, the flow sensor and the servo motor, the control circuit including a controller that executes software that responds to signals received from the keypad and the flow sensor by operating the servo motor to dispense predefined quantities of beverage.

16. The dispenser as recited in claim 15 wherein the plurality of switches comprises:
   a plurality of selector switches by which a user designates a first plurality of different sizes of serving portions of the beverage to dispense, wherein the control circuit responds to activation of each of the plurality of switches by operating the servo motor to dispense different quantities of the beverage;
   a pour cancellation switch for manual termination of beverage dispensing;
   a repeat pour switch for sequentially dispensing a plurality of serving portions of identical sizes as designated by activation of one of the plurality of switches; and
   a shift switch activation of which enables the plurality of switches to designate a second plurality of different sizes of serving portions of the beverage.

17. The dispenser as recited in claim 15 wherein the control circuit responds to activation of a predefined combination of the plurality of switches by entering a faucet cleaning mode, in which the servo motor is operated to open the faucet until at least one of the plurality of switches is activated again.

* * * * *